(12) United States Patent
Crawford (10) Patent No.: US 7,194,637 B1
(45) Date of Patent: Mar. 20, 2007

(54) METHOD FOR CONTROLLING ACCESS WITHIN A DISTRIBUTED SYSTEM CONTAINING AT LEAST ONE NETWORKED PROCESSOR-BASED SYSTEM AND A PLURALITY OF NON-NETWORKED PROCESSOR-BASED SYSTEMS

(76) Inventor: C. S. Lee Crawford, 1571 Coastal Dr., Rockwall, TX (US) 75087

(*) Notice: Subject to any disclaimer, the term of this patent is extended or adjusted under 35 U.S.C. 154(b) by 745 days.

(21) Appl. No.: 10/368,311

(22) Filed: Feb. 15, 2003

Related U.S. Application Data (60) Provisional application No. 60/359,549, filed on Feb. 25, 2002.

(51) Int. Cl.
*H04L 9/32* (2006.01)
(52) U.S. Cl. .............................. 713/200; 726/2; 726/26
(58) Field of Classification Search ................ 380/201; 726/1
See application file for complete search history.

(56) References Cited

U.S. PATENT DOCUMENTS

| | | | |
|---|---|---|---|
| 6,389,538 B1* | 5/2002 | Gruse et al. | 713/194 |
| 6,625,732 B1* | 9/2003 | Weirauch et al. | 726/26 |
| 6,772,340 B1* | 8/2004 | Peinado et al. | 713/168 |
| 2002/0049679 A1* | 4/2002 | Russell et al. | 705/52 |

\* cited by examiner

*Primary Examiner*—Ayaz Sheikh
*Assistant Examiner*—Saoussen Besrour (57) ABSTRACT

In one embodiment, a networked processor-based system is operated. Also, a non-network processor-based system is operated, wherein the networked and non-networked processor-based systems each include a security module that enables access to respective resources associated with the networked and non-networked processor-based systems. A handheld computer readable medium is received at the network processor-based system, wherein the handheld computer readable medium belongs to a first user. The networked processor-based system writes information to the handheld computer readable medium that indicates that a second user is not authorized to access the resource associated with the non-networked processor-based system.

6 Claims, 7 Drawing Sheets

METHOD FOR CONTROLLING ACCESS WITHIN A DISTRIBUTED SYSTEM CONTAINING AT LEAST ONE NETWORKED PROCESSOR-BASED SYSTEM AND A PLURALITY OF NON-NETWORKED PROCESSOR-BASED SYSTEMS

RELATED APPLICATIONS

This application claims the benefit of U.S. Provisional Patent Application Ser. No. 60/359,549, entitled "SYSTEMS AND METHODS OF SOFTWARE USE ANALYSIS," filed Feb. 25, 2002, which is incorporated herein by reference; this application is also related to concurrently filed and co-pending U.S. patent application Ser. No. 10/368,309 (now abandoned), entitled "DATA STRUCTURE FOR DETECTING AUTHORIZED USE OF DIGITAL CONTENT AND SYSTEMS AND METHODS FOR USE THEREOF;" U.S. patent application Ser. No. 10/368,309 (now abandoned), entitled "SYSTEMS AND METHODS FOR OPERATING A DIGITAL RIGHTS MANAGEMENT SERVER;" and U.S. patent application Ser. No. 10/368,306 (now abandoned), entitled "SYSTEMS AND METHODS FOR DETECTING AND ADDRESSING UNAUTHORIZED USE OF DIGITAL CONTENT WITHOUT REQUIRING A CENTRALIZED IDENTIFICATION OF USERS," which are incorporated herein by reference.

TECHNICAL FIELD

The present application is generally related to methods for controlling access to a resource associated with a non-networked processor based system.

BACKGROUND

Software piracy has become a very significant bane for software producers. In particular, the world wide web (WWW) has made unauthorized distribution of proprietary software, content, or other intellectual property belong to others amazingly simple and pervasive. For example, bulletin boards, web sites, and the like have enabled ordinary consumers to download intellectual property via the Internet with very little effort. Additionally, new technology has permitted small entities to copy CD-ROMs, DVDs, and other optical media with minimal expense.

Traditionally, software and content producers have attempted to prevent unauthorized distribution of their intellectual property via various anti-copying algorithms. For example, software and content producers often attempt to protect intellectual property via various encryption schemes. For example, software and content producers often encrypt the content on a media. Accordingly, the content on the media cannot be obtained and, therefore, cannot be copied without knowledge of the encryption key. For example, a software product may be stored on an optical media. Upon insertion of the optical media into an appropriate computer drive, an installation program may be executed. The installation program may request the user to enter the encryption key or some type of user code associated with the encryption key (which may be supplied to the user via a license sheet). The user enters the information and the installation program uses the information to recover the encrypted software code before storing the code in residence on the user's computer.

However, encryption schemes have proven to be exceptionally ineffective. First, the user must be provided the content key in one form or another. Accordingly, encryption schemes have not been able to prevent a dishonest user from copying the content. All encryption schemes must provide key-related information to an end-user at some point thus presenting an identified point of weakness to the security scheme. Also, experience has demonstrated that reverse engineering frequently allows encryption schemes to be broken altogether thereby allowing direct access to the digitally encoded content. Specifically, reverse engineering frequently relies upon redundancy of data and the assumption that an encryption scheme is utilized. By repeatedly observing or testing data, the encryption scheme may be circumvented.

Several issues are related to copy protection that are of particular relevance. First, the issue of casual copying is quite important to software producers. Casual copying refers to the process where an otherwise legitimate user purchases software and, then, installs the software on two different computers in an unauthorized manner. For example, a software product may be licensed for personal use on a single system. A consumer may purchase the software product. The consumer may install the software on the consumer's home computer and the consumer's work desktop computer. Moreover, the software product may be installed on each of the desktop computers of the employees of the consumer.

A very significant amount of work has been performed in the art to address casual copying. For example, U.S. Pat. No. 6,243,468 to Pearce et al., assigned to MICROSOFT CORPORATION, issued Jun. 5, 2001, addresses the issue of casual copying. The '468 patent notes that casual copying is "is very difficult to monitor and even more difficult to prosecute." In fact, the '468 patent does not identify any way to detect casual copying. Presumably, a software licensor may physically audit various computer systems. However, physically auditing computer systems is clearly unsatisfactory for most situations and is impossible for all systems that might be used for casual copying.

Accordingly, the '468 patent describes a scheme where a software product only becomes operable upon registration of the software with a registration center that is controlled by the software licensor. The registration center will not issue a registration identifier for multiple systems. Thereby, the algorithm of the '468 patent prevents casual copying.

However, it shall be appreciated that the '468 patent does not detect whether software has actually been used on two different computers in contravention of a software license. In fact, the '468 patent is premised upon the assumption that such actual use associated with casual copying cannot be detected. This is problematic when a consumer purchases a new personal computer and wishes to transfer all of the consumer's software to the new personal computer. Specifically, it is unknown how the user can "prove" to the registration center that the user will cease using the software on his or her previous computer. Thus, the consumer is forced to purchase an entirely new license or the registration center is forced to trust the consumer to only use the software on a single system.

Accordingly, there has been a well-recognized failure in the art to detect actual unauthorized software use associated with casual copying. Moreover, there is a long-felt need in the art to provide detection of unauthorized software use to avoid overly burdening software users.

BRIEF DESCRIPTION OF THE DRAWINGS

For a more complete understanding of the present invention, reference is now made to the following descriptions taken in conjunction with the accompanying drawings.

DETAILED DESCRIPTION

Figure 1:
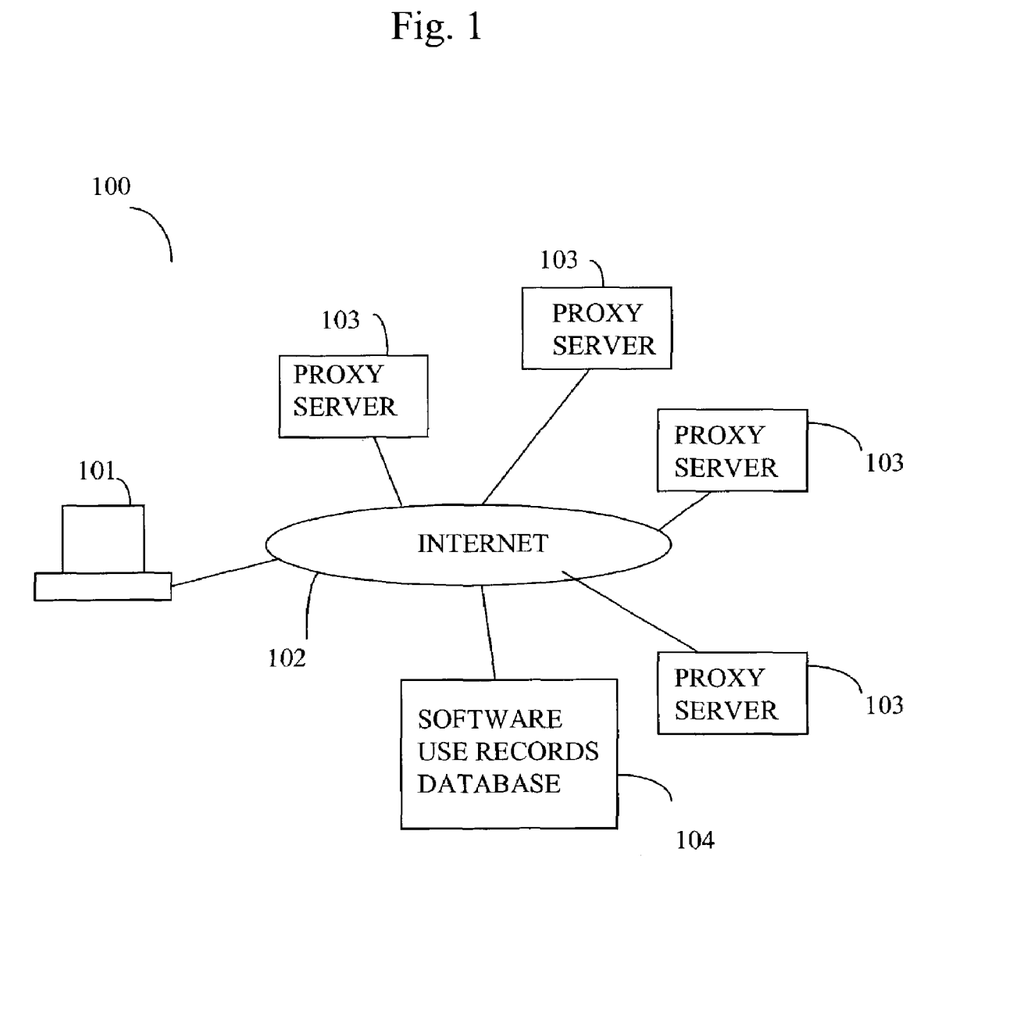
FIG. 1 depicts a system according to embodiments of the present invention.

Referring now of the drawings, FIG. 1 depicts system 100 according to embodiments of the present invention. System 100 comprises user system 101 (e.g., a personal computer, personal digital assistant, Internet appliance, wireless communication/computing device) that executes a software application locally. The software application may advantageously be associated with a unique identifier. System 101 may further create and update a suitable data structure to maintain a record of the use of the software application as will be discussed in greater detail herein. System 101 may, from time to time, communicate the data structure to one of proxy servers 103. The communication of the data structure to one of proxy servers 103 may occur by selecting an Internet Protocol address (or other suitable address or identifier) from a cache of such addresses which is periodically updated as discussed in U.S. patent application Ser. No. 10/368,310, entitled "SYSTEMS AND METHODS FOR OPERATING A DIGITAL RIGHTS MANAGEMENT SERVER." The one of proxy servers 103 that receives that data structure may forward the data structure to software use database server 104. System 101 may also, from time to time, send a query or request to one of proxy servers 103 to obtain all software use data structures satisfying a particular criteria (e.g., that match the unique identifier). The proxy server 103 may then obtain that information from software use database server 104 and return that information to system 101. Upon receipt of that information, system 101 may examine the received data to determine whether the use of the software application has occurred according to licensing terms. If not, appropriate action may be taken (e.g., further execution may be blocked).

Figure 2:
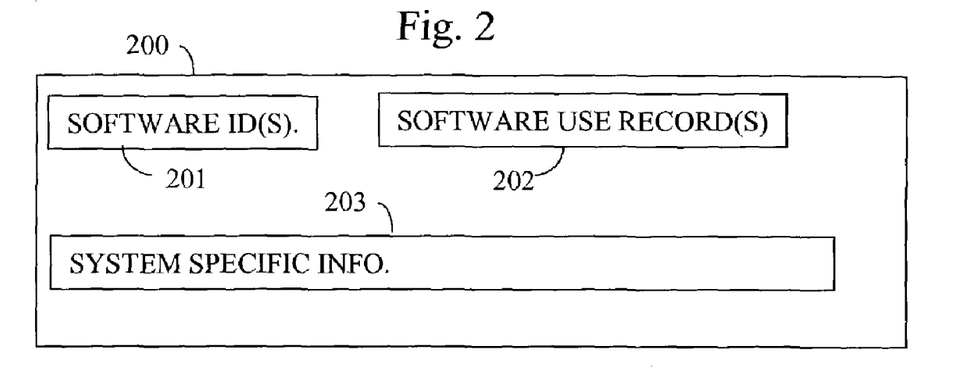
FIGS. 2 and 3 depict software use data structures according to embodiments of the present invention.

FIG. 2 depicts software use data structure 200 according to embodiments of the present invention. Software use data structure 200 comprises information that indicates or identifies a particular copy of a software application. For example, software use data structure may include fields for software ID(s) 201. Additionally, software use data structure 200 may include software use records 202 which indicate whether the respective software applications identified by software ID(s) 201 have been used at particular times. Software use data structure 200 may also include system specific information 203 that is related to the system on which the use of the digital content occurred. System specific information 203 may uniquely identify the system on which the use of the digital content occurred by, utilizing, for example, hardware ID's (e.g., the Media Access Identifier, SCSI ID of a peripheral(s), etc.) associated with the user system. Alternatively, system specific information 203 may comprise sufficient information to exclude other systems while not containing sufficient information to identify the user's system from a centralized location as detailed in U.S. patent application Ser. No. 10/368,308, entitled "SYSTEMS AND METHODS FOR DETECTING AND ADDRESSING UNAUTHORIZED USE OF DIGITAL CONTENT WITHOUT REQUIRING A CENTRALIZED IDENTIFICATION OF USERS."

Figure 3:
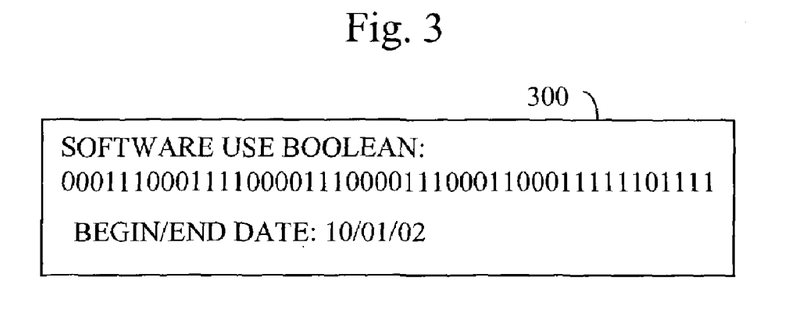

FIG. 3 depicts software use boolean structure 300 which may be used to implement software use records 202 according to embodiments of the present invention. Software use boolean structure 300 comprises a string of boolean values. Each "one" may represent that the particular digital content was used or accessed on a particular day. Each "zero" may represent that the particular digital content was not used or accessed on a particular day. Software use boolean structure 300 may further comprise a field that indicates a reference point (e.g., a beginning day, an ending day, etc.) to allow the respective day associated with each boolean value to be determined.

Figure 4:
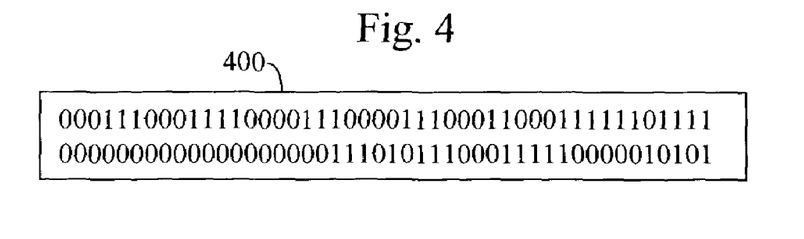
FIG. 4 depicts an alignment of software use booleans according to embodiments of the present invention.

To perform an analysis of whether digital content is being used in accordance with licensing terms, the boolean strings of two software use data structures 200 may be aligned according to the respective references dates as shown in aligned boolean strings 400 in FIG. 4. Thus, each boolean value in the upper boolean string is associated with the same date as the corresponding boolean value in the lower boolean string. By examining the boolean strings, unauthorized use may be detected. For example, when the digital content has been used or accessed on two different systems on the same day, it may be concluded that unauthorized use has occurred. Alternatively, when no software use booleans are overlapping (occurring on the same day), when software booleans are interleaved (e.g., alternating between one system and the other), it may be concluded that unauthorized use has occurred.

Figure 5:
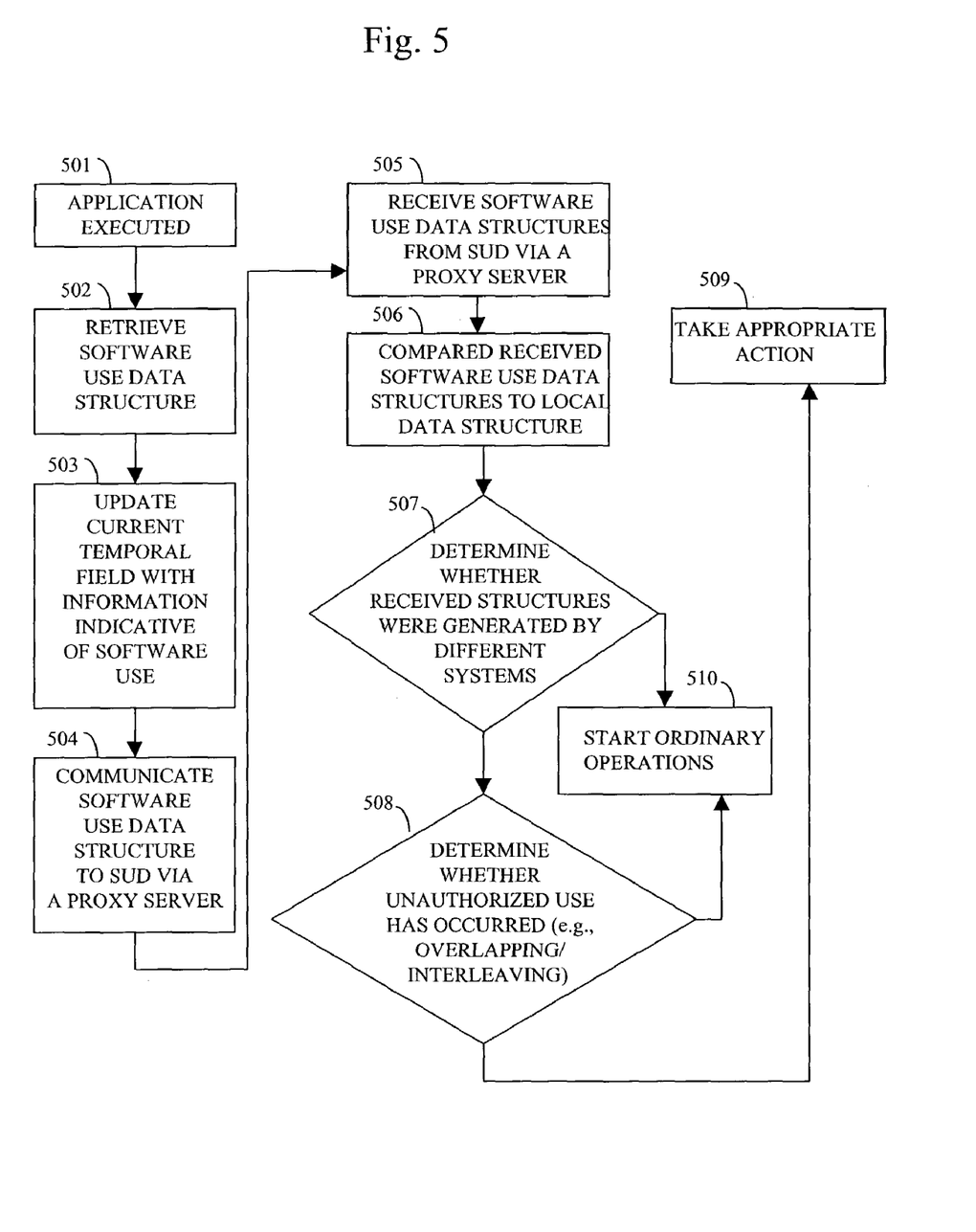
FIG. 5 depicts a flowchart according to embodiments of the present invention.

FIG. 5 depicts flowchart 500 according to embodiments of the present invention. In step 501, an application is executed or other digital content is accessed. In step 502, a suitable software use data structure is retrieved. In step 503, the current temporal element is updated with information indicative of use or access for that temporal period (e.g., that day). In step 504, the software use data structure is communicated to a suitable software use database via a proxy server. In step 505, software use data structures are received from the software use database via a proxy server. For example, a query may be submitted that requests all software use data structures associated with a particular serial number. All matching software use data structures matching the serial number (including those previously communicated by the particular system in question) may be returned. In step 506, the received software use data structures are compared to the local data structure(s). In step 507, a logical comparison is made to determine whether the received data structures were generated by different systems. If not, the process flow proceeds to step 510. If the logical comparison of step 507 is true, the process flow proceeds to step 508. In step 508, it is determined whether unauthorized use has occurred (e.g., it is determined whether use has occurred in an overlapping or interleaved manner). If unauthorized use has occurred, the process flow proceeds to step 509 where appropriate action is taken (e.g., use of the digital content on the particular system may be blocked). If the determination in step 508 indicates that unauthorized use has occurred, the process flow proceeds to step 510. In step 510, ordinary operations may occur.

By utilizing a suitable data structure that records actual instances of software use, embodiments of the present invention enable detection and remediation of casual software piracy (and, pervasive software piracy) to occur. By enabling the detection of the unauthorized use of digital content, embodiments of the present invention do not suffer from the difficulties associated with other anti-piracy schemes. For example, product activation schemes require a user to reactivate the software when the user either appreciably updates their computer system or changes to another user system. In product activation schemes, the activation entity must either trust that the user will actually cease use of the product on a prior system, charge the user a fee for the reactivation, or both, because according to known anti-piracy algorithms there is no way to verify the user's future behavior. Embodiments of the present, however, enable the user's contravention of licensing terms to be detected by, for example, the software operating on the user's prior system. By doing so, the unauthorized copy of the application may be caused to cease functioning.

As discussed above, communication of software use record data structures (SURDSs) may occur utilizing the Internet and a proxy/centralized server architecture. However, it shall be appreciated that the present invention does not require network connectivity. Representative embodiments may utilize other communication mechanisms to facilitate the detection and remediation of the unauthorized use of digital content.

Figure 6:
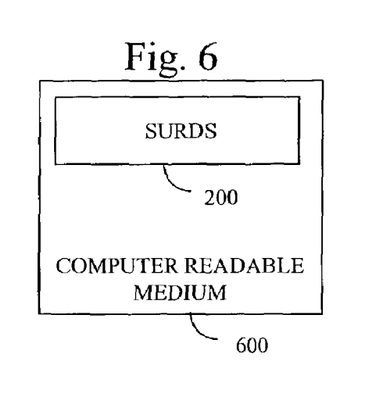
FIGS. 6 and 7 depict computer readable medium according to representative embodiments.

Representative embodiments may utilize "disk/disc contamination" to facilitate such detection and remediation. As shown in FIG. 6, SURDS(s) 200 or other suitable data structures may be written on computer readable medium 600. If computer readable medium 600 is a removable medium (e.g., a floppy disk), when computer readable medium 600 is exchanged between systems, the respective SURDSs may be communication, analysis thereof (e.g., in comparison to local SURDs), and remediation if appropriate may occur. Likewise, the second system may write any of its locally available SURDSs 200 to computer readable medium 600 so that if computer readable medium is returned to the first system, the respective SURDSs may be communicated, analysis thereof may occur, and remediation, if appropriate, may occur.

Figure 7:
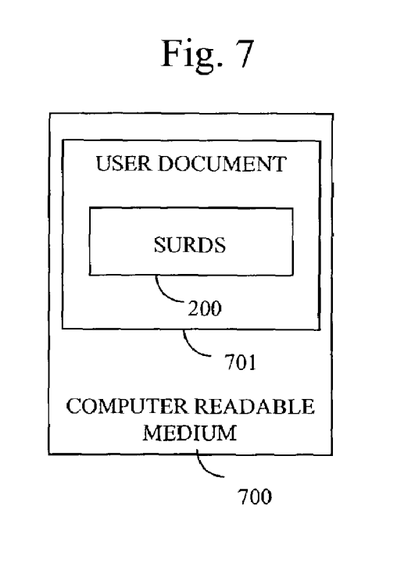

Similarly, computer readable medium 700 may include user document/file 701. User document/file 701 may be any suitable user file such as a word processing document, a spreadsheet file, a user database, and/or the like. SURDSs 200 are attached to computer readable medium 700 as metadata. When computer readable medium 700 is exchanged between systems, the respective SURDSs may be communicated, analysis thereof (e.g., in comparison to local SURDs) may occur, and remediation, if appropriate, may occur. Additionally, when a file transfer operation occurs (e.g., communicated through a temporary wired or wireless connection), the metadata may be retrieved, analyzed, and processed appropriately. Likewise, the second system may write any of its locally available SURDSs 200 to computer readable medium 700 so that if computer readable medium is returned to the first system, the respective SURDSs may be communication, analysis thereof, and remediation if appropriate may occur.

Moreover, when computer readable mediums 600 or 700 are generated by a non-networked system and are exchanged with a networked system, an appropriate software process on the networked system may communicate with one of proxy servers 103 to communicate SURDSs 200 to software use database 104. Moreover, additional SURDSs 200 (e.g., generated by the use of the same digital content on other systems) may be received at the second system from software use database 104 via one of the proxy servers. The received SURDSs 200 may be rewritten as metadata to computer readable medium 700 or within a file on computer readable medium 600. Then, if the respective computer readable medium is returned to the original system at a later date (or a different file transfer operation occurs), the SURDSs 200 from software use database 104 are then available on the first system.

Figure 8:
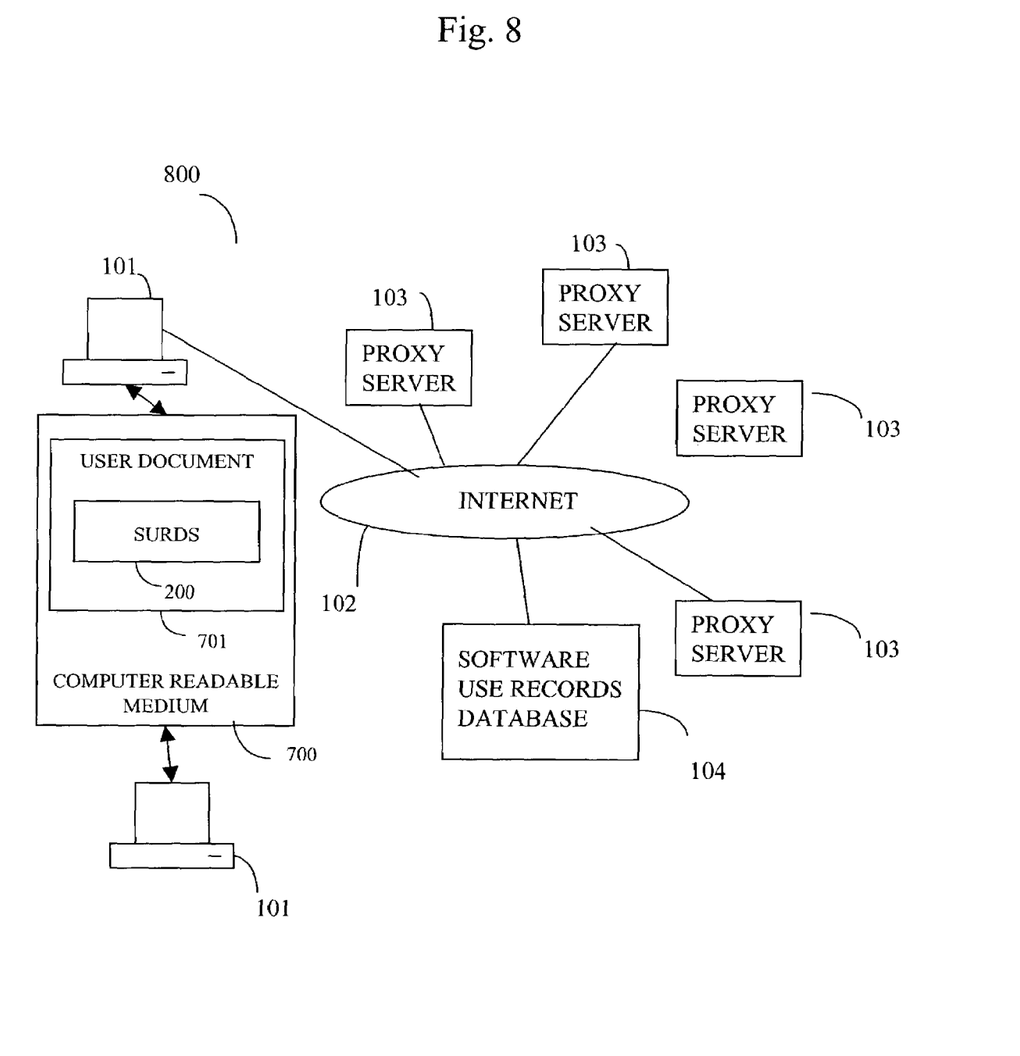
FIG. 8 depicts a system according to representative embodiments.

FIG. 8 depicts system 800 according to representative embodiments. System 800 is substantially similar to system 100. However, system 800 further includes a particular user system 101 which is not networked. Software processes on system 101 may communicate (transmit and receive) software use record data structures by using, for example, computer readable medium 700. The metadata associated with user document 701 may retrieved and/or added to by the other user system 101 which is networked.

Figure 9:
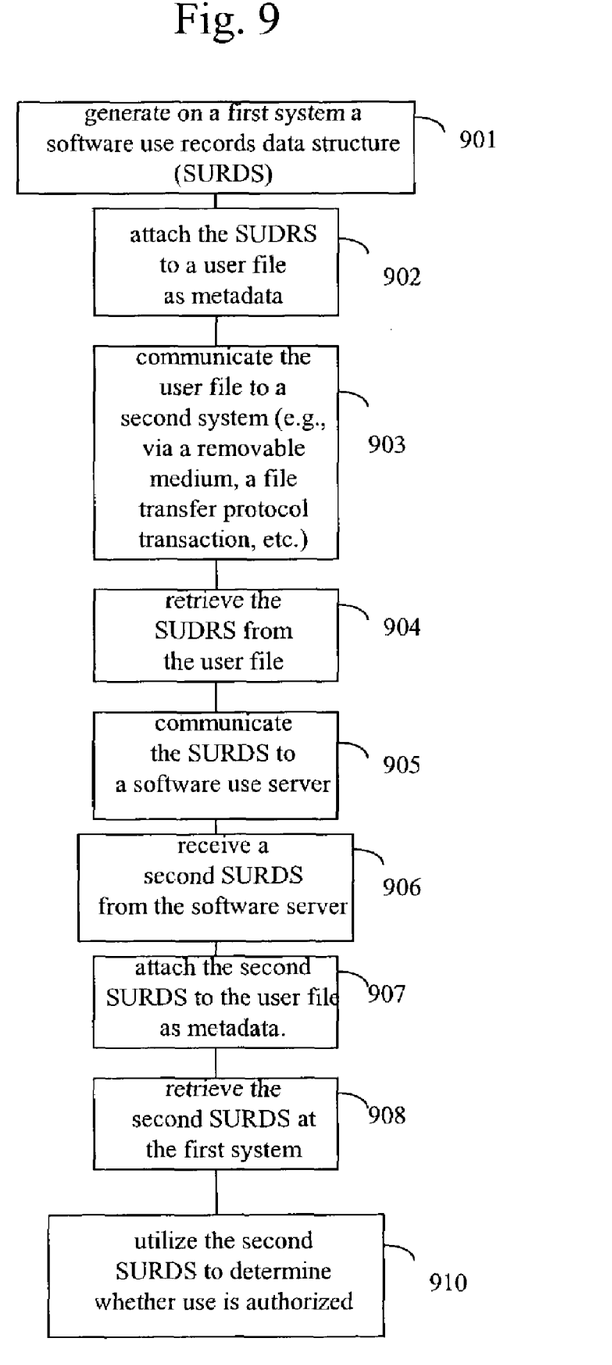
FIG. 9 depicts a flowchart according to representative embodiments.

FIG. 9 depicts a flowchart according to embodiments of the present invention. In step 901, software use records data structures are generated on on a first system. In step 902, the SUDRSs are attached to a user file as metadata. The attaching may occur when a user document is opened, saved, closed, and/or the like. The attaching may also occur upon insertion of a computer readable medium. The mechanism or software that performs the attaching may be implemented in the user application protected by representative embodiments, in the operating system, or by a separate software process. Moreover, it shall be appreciated the multiple SURDSs that are associated with multiple user applications may be attached for further processing. In step 903, the user file is communicated to a second system (e.g., via a removable medium, a file transfer protocol transaction, etc.). In step 904, the SUDRSs are retrieved from the user file. In step 905, the retrieved SURDSs are communicated to a software use server. In step 906, a second set of SURDSs are received from the software server. In step 907, the second set of SURDSs are attached to the user file as metadata. In step 908, the second set of SURDSs are retrieved at the first system. The retrieved SURDSs may also be attached to other user files on the first system. In step 909, the second set of SURDSs are utilized to determine whether use is authorized.

To illustrate advantages of representative embodiments, several examples are appropriate. For example, suppose USER A installs and uses APPLICATION A on both of SYSTEM A and B (the USER's home SYSTEM and the USER's work SYSTEM). Again, suppose USER A works on a document at the USER's office, saves the document to a floppy, and brings the floppy home to perform additional work. The SURDS 200 stored on the computer readable medium as a separate file or as metadata attached to the USER document may be used by a suitable detection and remediation software process to detect and remediate the unauthorized use of digital content on the non-networked computer. Specifically, the software process may prevent further execution of APPLICATION A on the non-networked SYSTEM. Alternatively, APPLICATION A may be caused to operate in a limited capacity mode (e.g., only reading documents but not saving new edits).

Further, suppose USER A receives APPLICATION B from USER B. APPLICATION B is installed on and used by USER A on SYSTEM A. Suppose further that USER B installs and uses APPLICATION B on SYSTEM C which is a networked SYSTEM. Suppose USER A returns the computer readable medium to SYSTEM B. A software process may examine the respective file and/or metadata and thereby determine that APPLICATION B is installed on another SYSTEM (i.e., SYSTEM A in this case). The software process may query one of proxy servers 103 to obtain SURDSs 200 for that particular APPLICATION. After receiving the SURDSs 200, the software process may write the SURDSs 200 to a computer readable medium as a suitable file and/or write the received SURDSs 200 as metadata attached to one or more USER documents/files. When USER A returns the computer readable medium to SYSTEM A, the SURDSs 200 may be analyzed to detect the use of APPLICATION B on SYSTEM C. Appropriate action may be taken.

It shall be appreciated that representative embodiments may provide appreciable advantages. Specifically, the detection and remediation of casual piracy may occur on non-networked systems which was previously unobtainable. Representative embodiments further reduce the prospect of individuals utilizing disk rebuilding techniques to attempt to circumvent anti-piracy algorithms. In particular, malicious user's may utilize a software process to continuously change application software files and registry values to their initial states that previously existed immediately after installation and/or activation. However, malicious user's generally cannot continuously revert user documents to their original state, because doing so would cause the user's work (e.g., word processing documents) to be lost. Representative embodiments make the prospect of casual piracy significantly less attractive. Specifically, to ensure that the use of a pirated form of digital content is not addressed, the user must maintain the user's system in complete isolation. The user cannot network the system. Moreover, the user cannot share files (via removable computer readable media or otherwise) with other systems. Thus, the value of the user's system becomes much lower. In particular, the reduction of the value of the user's system is most likely greater than the value of the misappropriated digital content thereby reducing the propensity of individuals to pirate digital content.

Embodiments of the present invention may be implemented on general purpose processor based devices including, but not limited to, personal computers, desktop computers, laptops, servers, personal data assistants, programmable telephones (wireless or otherwise) or any other device capable of executing programmable instructions. Such devices may include an appropriate processor such as Intel Pentium processor or a SPARC processor. However, the present invention is not restricted to any particular processor architecture. The devices may include random access memory components such as SRAM, DRAM, SDRAM, and/or the like. The devices may include non-volatile storage components such as PROM, EPROM, EEPROM, flash memory, cartridge memory, memory sticks, hard drives, floppy drives, optical drives, tape drives, and/or the like. The devices may include various interfaces to couple to communication networks. For example, the devices may couple to the Internet, Intranets, Ethernets, LANs, WANs, SONET networks, wireless networks, wireline networks, and/or the like. The devices may further contain various user interfaces to obtain or provide information to users including, but not limited to, displays, keyboards, keys, pointing devices, and/or the like.

When implemented via executable instructions, various elements of embodiments of the present invention are in essence the code defining the operations of such various elements. The executable instructions or code may be obtained from a readable medium (e.g., a hard drive media, optical media, EPROM, EEPROM, tape media, cartridge media, flash memory, ROM, and/or the like) or communicated via a data signal from a communication medium (e.g., the Internet). In fact, readable media can include any medium that can store or transfer information. For example, executable instructions implementing the process flow of the preceding flowcharts that use the preceding data structures may be stored thereon. Such executable instructions may be embedded in the particular software application for which software use recordation and analysis occurs. Alternatively, the executable instructions may be implemented as a separate program or within the operating system.

Although some embodiments have been described in terms of controlling access to digital content and software content, the present invention is not so limited. Some embodiments may be used to control any resource to which access is controlled by a security module on a non-networked processor based system.

Figure 10:
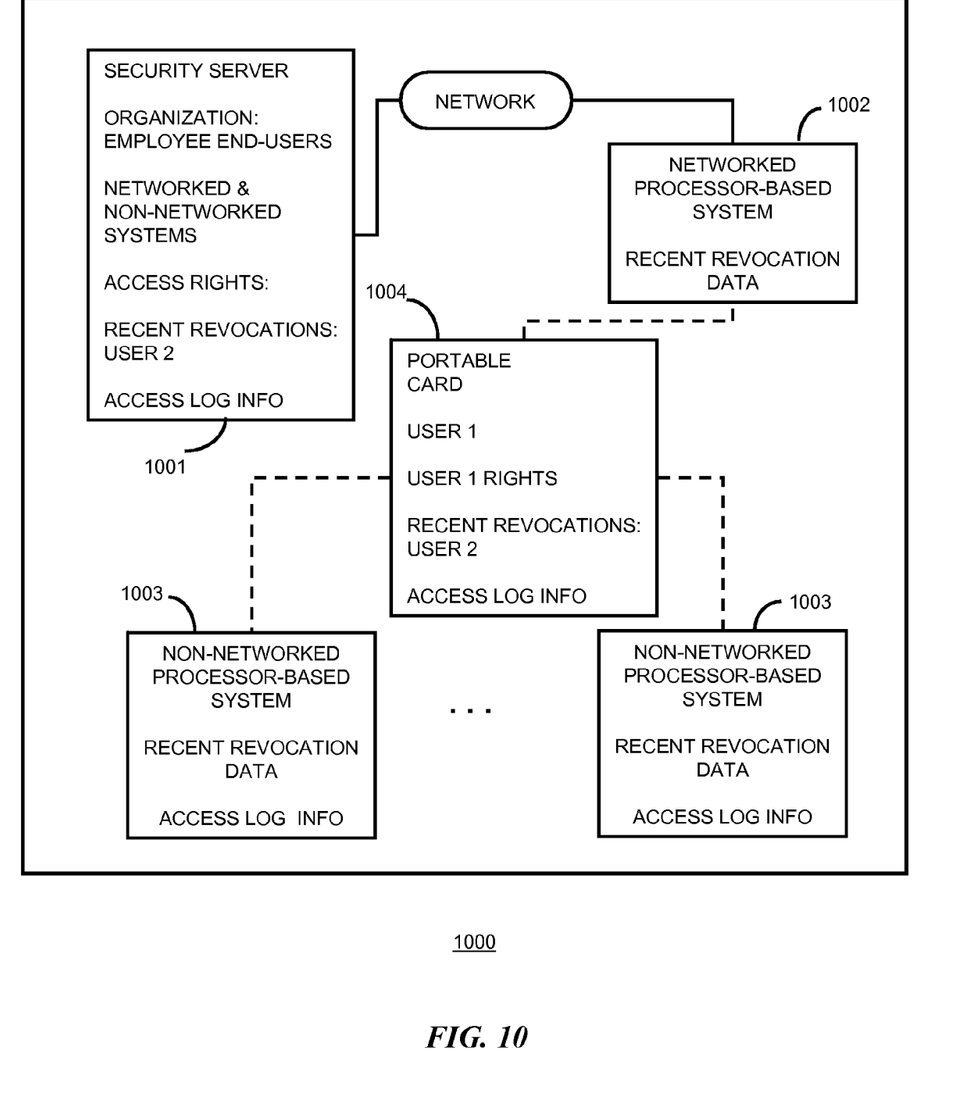
FIG. 10 depicts a distributed system for controlling access by end-users within a common organization according to one representative embodiment.

Specifically, in one embodiment, a method controls access rights within a distributed system 1000 where the distributed system comprises at least one security server 1001 for managing access rights and at least one networked processor-based system 1002 that processes access attempts to provide or deny access and multiple non-networked processor-based systems 903 that process access attempts to provide or deny access as shown in FIG. 10.

The method comprises processing an access attempt from a first end-user by the at least one networked processor-based system 1002, wherein the access attempt occurs when the first-end user is in physical proximity to the at least one networked processor-based system 1002, wherein the first end-user does not manage, control, or modify access rights within the distributed system 1000. In conjunction with processing of the access attempt by the networked processor-based system 1002, a portable card 1004 is read by the at least one networked processor-based system 1002, wherein the portable card 1004 belongs to the first end-user and comprises data identifying the first end-user and data relevant to access rights associated with the first end-user. The information stored on the portable card of the first-end user that identifies the first-end user can be a serial number that is correlated to the first-end user by an entry in a database associated with the at least one security server. Additionally or alternatively, the information stored in the portable card of the first-end users may identify the first-end user by a text format or by any other suitably formatted data. Any other suitable information can be stored on the portable card. Also, any suitable data structure or data structures can be employed.

Recently updated revocation data is also obtained by the networked processor-based system 1002 from the at least one security server 1001, the revocation data indicating that previously existing access rights allowing access that are specific to a second end-user have been revoked, wherein the second end-user does not manage, control, or modify access rights within the distributed system 1000. The first end-user and the second-end user are employees of a common organization and the at least one security server 1001 maintains one or several databases that store and associate data pertaining to end-user employees of the common organization, networked and non-networked processor based systems 1002, 1003 of the common organization, and access rights specific to the common organization In conjunction with processing of the access attempt by the networked processor-based system 1002, the obtained updated revocation data is written by the networked processor-based system 1002 to the portable card 1004 of the first-end user. The portable card 1004 is physically transported by the first-end user from the networked processor-based system 1002 to multiple non-networked processor-based systems 1003.

Respective access attempts from the first end-user are processed by the multiple non-networked processor-based systems 1003, wherein the access attempts occur when the first-end user is in physical proximity to the multiple networked processor-based systems 1003. In conjunction with processing of the respective access attempts by the multiple non-networked processor-based systems 1003, the updated revocation data is read from the portable card 1004 of the first-end user by the multiple non-networked processor-based systems 1003 and is stored locally by the multiple non-networked processor-based systems 1003, wherein upon storing the updated revocation data, the multiple non-networked processor-based systems 1003 are operable to deny access to the second-end user if the second-user provides an access attempt to the multiple non-networked processor based systems 1003.

In another embodiment, accesses, by end-users, that do not manage control, or modify access rights within the distributed system, are logged at non-networked processor based systems 1003 in memory of the non-networked processor based systems 1003. In conjunction with processing access attempts by end-users by non-networked processor based systems 1003, log information is written by the non-networked processor based systems 1003 to portable cards of the end-users, wherein the end-users do not manage, control, or modify access rights within the distributed system 1000, wherein access log information by a plurality of end-users is written to individual end-user portable cards. In conjunction with processing access attempts by end-users by the at least one networked processor based systems 1002, the written access log information is read from the portable cards by the at least one networked processor-based system 1002. The access log information is communicated from the at least one networked processor-based systems 1002 to the security server 1001.

One or several mechanisms may be applied in conjunction with the access log information to prevent malicious individuals from interfering or preventing the communication of access log information. For example, the access log information is preferably cryptographically processed. In one embodiment, specific access log information is selected according to one or several predefined criteria for writing to portable cards of the end-users. In another embodiment, a random number generator is used to control writing of access log information to portable cards of the end-users.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of controlling access rights within a distributed system, the distributed system comprising at least one security server for managing access rights and at least one networked processor-based system that processes access attempts to provide or deny access and multiple non-networked processor-based systems that process access attempts to provide or deny access, the method comprising:

processing an access attempt from a first end-user by the at least one networked processor-based system, wherein the access attempt occurs when the first-end user is in physical proximity to the at least one networked processor-based system, wherein the first end-user does not manage, control, or modify access rights within the distributed system;

in conjunction with processing of the access attempt by the networked processor-based system, reading a portable card by the at least one networked processor-based system, wherein the portable card belongs to the first end-user and comprises data identifying the first end-user and data relevant to the access rights associated with the first end-user;

obtaining recently updated revocation data by the networked processor-based system from the at least one security server, the revocation data indicating previously existing access rights allowing access that are specific to a second end-user have been revoked, wherein the second end-user does not manage, control, or modify access rights within the distributed system, and wherein the first end-user and the second end-user are employees of a common organization and the at least one security server maintains one or several databases that store and associate data pertaining to the end-user employees of the common organization, networked and non-networked processor-based systems of the common organization, and access rights specific to the common organization;

in conjunction with processing of the access attempt by the networked processor-based system, writing the obtained updated revocation data by the networked processor-based system to the portable card of the first end-user;

physically transporting the portable card by the first end-user from the networked processor-based system to multiple non-networked processor-based systems;

processing respective access attempts from the first end-user by the multiple non-networked processor-based systems, wherein the access attempts occur when the first-end user is in physical proximity to the multiple non-networked processor-based systems;

in conjunction with processing of the respective access attempts by the multiple non-networked processor-based systems, reading the updated revocation data from the portable card of the first-end user by the multiple non-networked processor-based systems and locally storing the updated revocation data by the multiple non-networked processor-based systems, wherein upon storing the updated revocation data, the multiple non-networked processor-based systems are operable to deny access to the second end-user when the second end-user provides an access attempt to the multiple non-networked processor-based systems;

logging accesses, by end-users, that do not manage, control, or modify access rights within the distributed system, at non-networked processor-based systems in memory of the non-networked processor based systems;

in conjunction with processing access attempts by the end-users by non-networked processor-based systems, writing access log information by the non-networked processor-based systems to portable cards of the end-users, wherein the end-users do not manage, control, or modify access rights within the distributed system, wherein access log information by a plurality of end-users is written to individual end-user portable cards;

in conjunction with processing access attempts by end-users by the at least one networked processor-based system, reading the written access log information from the portable cards by the at least one networked processor-based system;

communicating the access log information from the at least one networked processor-based system to the to the at least one security server; and updating by the at least one security server, searchable records of accesses by users of the common organization upon receiving communication of the access log information.

2. The method of claim 1 further comprising: clearing out-dated revocation data from local memory by the non-networked processor based-systems.

3. The method of claim 1 further comprising:

cryptographically processing the access log information by the non-networked processor based systems before storing access log information to portable cards.

4. The method of claim 1 further comprising:

selecting, by the non-networked processor based systems, specific access log information according to one or several predefined criteria for writing to portable cards of the end-users.

5. The method of claim 1 further comprising:

using, by the non-networked processor based systems, a random number generator to control writing of access log information to portable cards of the end-users.

6. The method of claim 1, wherein information stored on the portable card of the first-end user that identifies the first-end user is a serial number that is correlated to the first-end user by an entry in a database associated with the at least one security server.

* * * * *